United States Patent [19]

McElveen

[11] 4,154,692

[45] May 15, 1979

[54] FLAME RETARDANT PROCESS, SOLUTION AND STRUCTURES

[76] Inventor: John B. McElveen, Rte. 1, Box 65, Wallace, N.C. 28466

[21] Appl. No.: 852,276

[22] Filed: Nov. 17, 1977

Related U.S. Application Data

[63] Continuation of Ser. No. 677,280, Apr. 15, 1976, abandoned.

[51] Int. Cl.$^2$ .............................................. C09K 3/28
[52] U.S. Cl. .................................... 252/8.1; 8/116 P; 106/15.05; 427/394; 427/439; 428/277; 428/921
[58] Field of Search ........................ 8/116 P, 171, 129; 106/15 FP; 252/8.1; 427/394, 439; 428/277, 921; 260/29.6 MP, 45.7 P

[56] References Cited

U.S. PATENT DOCUMENTS

| | | | |
|---|---|---|---|
| 2,415,113 | 2/1947 | Seymour et al. | 428/277 |
| 3,087,836 | 4/1963 | Dearborn | 260/29.6 MP |
| 3,607,745 | 9/1971 | DePietro | 260/45.7 P |
| 3,749,599 | 7/1973 | Bergman | 252/8.1 |
| 3,749,600 | 7/1973 | Bergman et al. | 252/8.1 |
| 3,856,535 | 12/1974 | Ferguson | 252/8.1 |
| 3,877,974 | 4/1975 | Mischutin | 252/8.1 |
| 3,915,915 | 10/1975 | Donaldson et al. | 252/29.6 MP |

OTHER PUBLICATIONS

Lange's Handbook of Chemistry, Handbook Publishers, Inc., Sandusky, Ohio, 1946, pp. 488, 489, 490, 491, 496 & 497.

Stephen et al., (Editors), Solubilities of Inorganic and Organic Compounds, vol. 2, part 2, The MacMillan Co., New York, 1960, pp. 1097, 1098, 1102, 1103, 1105, 1106, 1107, 1111, 1120, 1126 & 1167.

*Primary Examiner*—Leland A. Sebastian

[57] ABSTRACT

This invention comprises a novel flame retardant process and solution whereby textile structures are rendered flame retardant.

11 Claims, No Drawings

FLAME RETARDANT PROCESS, SOLUTION AND STRUCTURES

This is a continuation of application Ser. No. 677,280 filed Apr. 15, 1976 now abandoned.

BACKGROUND AND OBJECTIVES OF THE INVENTION

In recent years the textile industry has increased its efforts in developing fibers and fabrics which are more resistant to burning. Stringent flammability standards have evolved and the consumer is more aware today than ever before of the hazards that prevail when wearing-apparel or textile furnishings are purchased that have not been rendered flame retardant.

There have been many processes suggested in the past to lessen the burning ability of textile products. Some of these methods employ flame retardant additives in the spinning fluid, before fiber formation, while others consist of surface treatment of the fibers or fabrics after formation. Both of these methods have severe drawbacks, because, by adding a flame retardant prior to the fiber formation the fiber characteristics, such as tensile strength and resistant to oxidative degradation, are often reduced. The surface treatments of fibers are often only a temporary measure and subsequent launderings or dry cleanings strip the fiber of its flame retardant.

With these facts in mind, it is one of the objects of this invention to provide a flame retardant that is easily applied to either fibers or fabrics.

It is another object of this invention to provide a flame retardant that is economical and durable.

It is yet another object of this invention to provide a flame retardant that is inexpensive and one that does not effect the fiber characteristics due to its application.

It is yet another object of this invention to provide a flame retardant which can be added during processing of the textile structures, including dyeing operations.

It is yet another object of this invention to provide a flame retardant which does not require elaborate or expensive equipment for application.

DESCRIPTION AND EXAMPLES OF THE INVENTION

This invention consists of a flame retardant solution, a process by which the desired material is treated with the flame retardant solution, and the flame retardant structure.

The material to be rendered flame retardant is cellulose acetate or cellulose triacetate which are considered equivalent for the purposes of this application. The process consists of immersing the acetate fibers into a heated water/alcohol solution containing a suitable flame retardant compound such as Tris-2,3 dibromopropyl phosphate, Tris-2,3 dichloropropyl phosphate, Ethyl-tetrobromo benzoate, Bis-2-bromomethyl-3,5 dibromophenyl phosphate, or similar compounds. The water/alcohol solution causes the acetate fibers to "swell" and form openings along the fibers into which the flame retardant solution penetrates. The fibers are then removed from the flame retardant solution and are treated to subsequent rinsing or washing operations and during the cooling or rinsing action the fibers contract to their original size. In this manner, the flame retardant is "locked" into the fiber and subsequent laundering or dry cleaning operations will not wash off the flame retardant as is common to most surface treatment of fibers.

If it is also desirable to incorporate a dye into the flame retardant solution, this can be easily accomplished by selecting a dye which is compatible with the flame retardant solution.

Examples of flame retardant solutions and methods using them in conjunction with acetate fibers are specifically described as follows:

EXAMPLE 1

One liter of flame retardant solution was prepared by adding 150 cc of Tris-2,3 dibromopropyl phosphate to 850 cc of 70% water/30% ethanol mixed in such a ratio as to yield a solution after adjustment by adding a slight amount of ethanol and water of specific gravity of 0.9 at 90° F. One square yard of 100% acetate tricot fabric and one square yarn of woven 100% acetate fabric were immersed and allowed to soak in the solution at 90° F.–100° F. for 20 minutes. The fabrics were then lightly squeezed and air dried. The treated fabrics did not sustain combustion when ignited, while the untreated fabric burned under the same conditions of high temperature application.

EXAMPLE 2

The procedure of Example 1 was repeated using a fabric made from a blend of 80% Arnel triacetate fiber (product of the Celanese Fiber Company) and 20% nylon polyamide fiber. The treated and untreated samples were then subjected to the flammability test specified in the Federal Standard DOC-FF-3-71 for children's sleepwear. A sample of similar fabric made from a blend of 80% flame resistant Arnel triacetate fiber (in which a flame retardant was incorporated during the spinning process) and 20% nylon polyamide was included in the test for comparison. The results were as follows:

|  | 80/20 Triacetate/ Nylon Untreated | 80/20 Triacetate/ Nylon Treated - Example 2 | 80/20 FR Acetate/ Nylon |
|---|---|---|---|
| Char length, inches | 10 (BEL*) | 3.4 | 3.2 |
| Residual flame, time, seconds | N.A.** | 0 | 0 |

*BEL - burned entire length of 10-inch specimen.
**N.A. - not applicable (when specimen is completely consumed).

EXAMPLE 3

A solution of 20 cc of Tris-2,3 dibromopropyl phosphate in 300 cc of 70% isopropyl alcohol plus 700 cc of water was heated to 130° F. During heating, the solution maintained a milky appearance. A light-weight (2.3 ounces/square yard) 100% acetate fabric sample (about one square yard) was immersed in the solution which immediately became clear as the flame retardant was absorbed into the fabric. After 30 seconds immersion, the fabric was removed, squeezed and air dried. Flammability test results on replicate samples according to DOC-FF-3-71 are given below:

| | Untrated | | Treated | |
|---|---|---|---|---|
| Specimen Direction | Char length inches | Residual flame time, seconds | Char length inches | Residual flame time, seconds |
| Length | 10 (BEL) | N.A. | 2.8 | 0 |

-continued

| Specimen Direction | Untrated | | Treated | |
|---|---|---|---|---|
| | Char length inches | Residual flame time, seconds | Char length inches | Residual flame time, seconds |
| Length | 10 (BEL) | — | 2.0 | 0 |
| Length | 10 (BEL) | — | 2.8 | 0 |
| Width | 10 (BEL) | — | 2.7 | 0 |
| Width | 10 (BEL) | — | 2.7 | 0 |

EXAMPLE 4

100% acetate tricot fabric, weighing 4.1 ounces/square yard was immersed in a slightly cloudy solution of 10 cc of Tris-2,3 dibromopropyl phosphate in 700 cc of 70% isopropanol plus 400 cc of water with the specific gravity adjusted to 0.9 at 90° F. by adding water. The solution became clear immediately as the fabric was immersed. After 30 minutes at 90° F., the fabric was removed, squeezed, dried and washed at 120° F.

This experiment was then repeated using a fabric made from a blend of Arnel triacetate and polyester.

Results of flammability tests carried out on these fabrics according to DOC-FF-3-71 are as follows:

| | Average of Five Specimens | |
|---|---|---|
| | Char length inches | Residual flame time, seconds |
| 100% Acetate tricot | | |
| Untreated | 10 (BEL) | N.A. |
| Treated | 1.9 | 0 |
| Arnel/Polyester | | |
| Untreated | 10 (BEL) | 25 |
| Treated | 2.7 | 0 |

It is clear from experiments that even at very low concentrations of flame retardants in solution (10 cc in 1110 cc of solution), excellent flame resistance is obtained by the process described herein.

EXAMPLE 5

Four liters of 70/30 by volume 70% Isopropanol/water solution (containing 20 cc [or approximately 5 cc/liter] of Tris-2,3 dibromopropyl phosphate) were prepared, and the specific gravity at 90° F. was adjusted to 0.9 by adding 400 cc of water. This solution was used to treat several fabrics in the following sequence:

| Fabric | Minutes Treatment | Temperature °F. |
|---|---|---|
| Arnel/polyester tricot | 20 | 90°-100° |
| 80/20 Arnel/nylon tricot | 20 | 90°-100° |
| 100% Acetate tricot | 20 | 90° |
| Arnel/polyester tricot | 5 | 120 |

After the treatment, each of the fabrics was squeezed, rinsed and dried. All treated fabrics exhibited good flame resistance, good appearance and excellent strength. Water to alcohol ratios may be varied and the example above shows specific ratios. However, solutions containing 20-80% water/80-20% alcohol ratios are suitable to carry out the process of this invention depending on the particular alcohols and flame retardants selected.

EXAMPLE 6

Flame retardant application and dyeing were combined in a single process by the following procedure in which a specific blue dye was selected as illustrative of those which can be used for the coloration of acetate and triacetate fibers.

| Treatment Solution: | |
|---|---|
| 70% | (by volume) Isopropyl alcohol |
| 30% | Water |
| 30 | grams per liter Tris-2,3 dibromopropyl phosphate |
| 5 | grams per liter Astrazon Blue BG (Basic Blue 3) |

The specific gravity of the solution was adjusted to 0.9 (by adding water) at 90° F.

| Fabrics: |
|---|
| Arnel triacetate/-T62 Dacron polyester tricot (7.2 oz./sq. yard) |
| 100% Acetate tricot (6.4 oz./sq. yard) |
| 80/20 Arnel triacetate/nylon tricot (8.9 oz./sq. yard) |
| 80/20 Acetate/nylon tricot (6.7 oz./sq. yard) |

The fabrics were treated together in the above solution for 20 minutes at 90°-100° F. They were then removed, squeezed and air dried. All were dyed an excellent shade of blue and the fabric hand was excellent. The fabrics were tested for flammability as finished, and also after 50 launderings at 140° F. as specified in the children's sleepwear standard DOC-FF-3-71. All samples exhibited char lengths of less than four inches and all exhibited zero residual flame time for all specimens tested before and after 50 launderings.

Examples as shown herein are not intended as limitations to the scope of this invention, and the components can be modified or changed without significantly departing from the spirit of this invention.

I claim:

1. A process for flame retarding cellulose acetate comprising: dissolving a water insoluble organic flame retardant in a solution of 20-80% water/80-20% monohydroxy alcohol having 1-4 carbon atoms, maintaining said solution at at least 90° F. while swelling and penetrating cellulose acetate with said solution.

2. A flame retardant process comprising applying a hot water/alcohol solution containing Tris-2,3 dibromopropyl phosphate to a textile structure, whereby said structure is rendered flame retardant.

3. A flame retardant process comprising applying a hot water/alcohol solution containing Tris-2,3 dichloropropyl phosphate to a textile structure, whereby said structure is rendered flame retardant.

4. A flame retardant process comprising applying a hot water/alcohol solution containing Ethyl-tetrabromo benzoate to a textile structure, whereby said structure is rendered flame retardant.

5. The textile structure of the process of claim 4.

6. A flame retardant process comprising applying a hot water/alcohol solution containing Bis-2-bromomethyl-3,5 dibromophenyl phosphate to a textile structure, whereby said structure is rendered flame retardant.

7. The textile structure of the process of claim 6.

8. A flame retardant solution for cellulose acetate comprising: a 90° F. or above 20-80% water/80-20% monohydroxy alcohol having 1-4 carbon atoms mixture and containing tris-2, 3, dibromopropyl phosphate.

9. A flame retardant solution for cellulose acetate comprising: a 90° F. or above 20–80% water/80–20% monohydroxy alcohol having 1–4 carbon atoms mixture and containing tris-2, 3, dichloropropyl phosphate.

10. A flame retardant solution for cellulose acetate comprising: a 90° F. or above 20–80% water/80–20% monohydroxy alcohol having 1–4 carbon atoms mixture and containing ethyl-tetrabromo benzoate.

11. A flame retardant solution for cellulose acetate comprising: a 90° F. or above 20–80% water/80–20% monohydroxy alcohol having 1–4 carbon atoms mixture and containing bis-2-bromomethyl-3, 5, dibromophenyl phosphate.

* * * * *